July 3, 1951  J. P. PALMER  2,559,513
SERVO SYSTEM WITH SATURABLE CORE COMPONENT
Filed Dec. 28, 1948  2 Sheets-Sheet 1

Inventor
JAMES P. PALMER
Attorney

July 3, 1951 J. P. PALMER 2,559,513
SERVO SYSTEM WITH SATURABLE CORE COMPONENT
Filed Dec. 28, 1948 2 Sheets-Sheet 2

Inventor
JAMES P. PALMER
By H. A. Mackey
Attorney

Patented July 3, 1951

2,559,513

UNITED STATES PATENT OFFICE 2,559,513

SERVO SYSTEM WITH SATURABLE CORE COMPONENT

James P. Palmer, Ames, Iowa, assignor to General Precision Laboratory Incorporated, a corporation of New York Application December 28, 1948, Serial No. 67,743

15 Claims. (Cl. 318—28)

This invention pertains to servo systems containing saturable reactors or saturable transformers.

By saturable reactor is meant an electromagnetic reactor containing in addition to its alternating current winding a direct current winding capable of producing enough ampere turns of magnetizing force to magnetize the core to saturation. Addition of a secondary alternating current winding to such a reactor converts it into a saturable transformer. It is preferable to arrange the windings of both devices so that no induction exists between any direct current winding and any alternating current winding as is well understood in the art.

In this disclosure saturable reactors and saturable transformers, grouped together, will be termed saturable electromagnetic devices.

It is possible to rectify a portion of the current flowing in the output alternating current winding of any saturable electromagnetic device by means of a rectifier connected in series with the winding, and to apply the rectified current to an additional winding in a direction to aid the magnetization produced by the direct current control winding. This action constitutes positive feedback, and the feedback current, proportional in amount to the current in the primary alternating winding, assumes part of the work of magnetization which otherwise would be done by the controlling direct current. In fact, the design may be made such that the feedback current takes over almost all of the work permitting very small direct currents to control a relatively large alternating current. It can be shown that the limit to the maximum amount of stable feedback which can be used is reached when the number of ampere turns on the feedback winding equals that of the alternating current primary winding.

In many types of servo systems the time lags inherent in some of the components may produce oscillations in a servo loop. This possibility places strict requirements on servo design and dictates attention to the reduction of time constants. In the past, it has often been assumed that the large electrical time constants associated with iron-cored coils of many turns preclude the use of saturable electromagnetic devices in servo systems, but experiments underlying the instant invention have shown this assumption to be false. It has been found that the time lag of a saturable electromagnetic device is inversely proportional to the frequency of the alternating current employed and it is well known that for a given time lag in any particular system the introduction of viscous friction or its equivalent can be made to damp out oscillation. Therefore, by increasing the frequency, by employing friction-equivalent elements, by the judicious use of positive feedback and by combination of the saturable electromagnetic devices with amplifiers of other types, servo systems containing saturable electromagnetic devices can be made to operate. In many applications the employment of saturable electromagnetic devices is to be preferred to the employment of equivalent electronic devices, particularly where large power is concerned in which case the auxiliary equipment required when electronic tubes are used becomes cumbersome and expensive and requires use of high electrical potentials.

A purpose of the present invention therefore, is to provide a servo system utilizing saturable electromagnetic devices thus producing a simpler and more economical device than has heretofore been available.

Strict static proportionality between the output of a servo system and its input resulting in complete elimination of zero error can be attained even theoretically only when the servo amplifier has infinite gain, and in practice the employment of an amplifier having infinite gain does eliminate all static follow-up error within practical design limits.

Another purpose of the present invention therefore, is to utilize an amplifier having infinite gain in combination with a saturable electromagnetic control device.

This invention will be more readily understood from the following detailed description considered together with the attached drawings in which.

Figure 1:
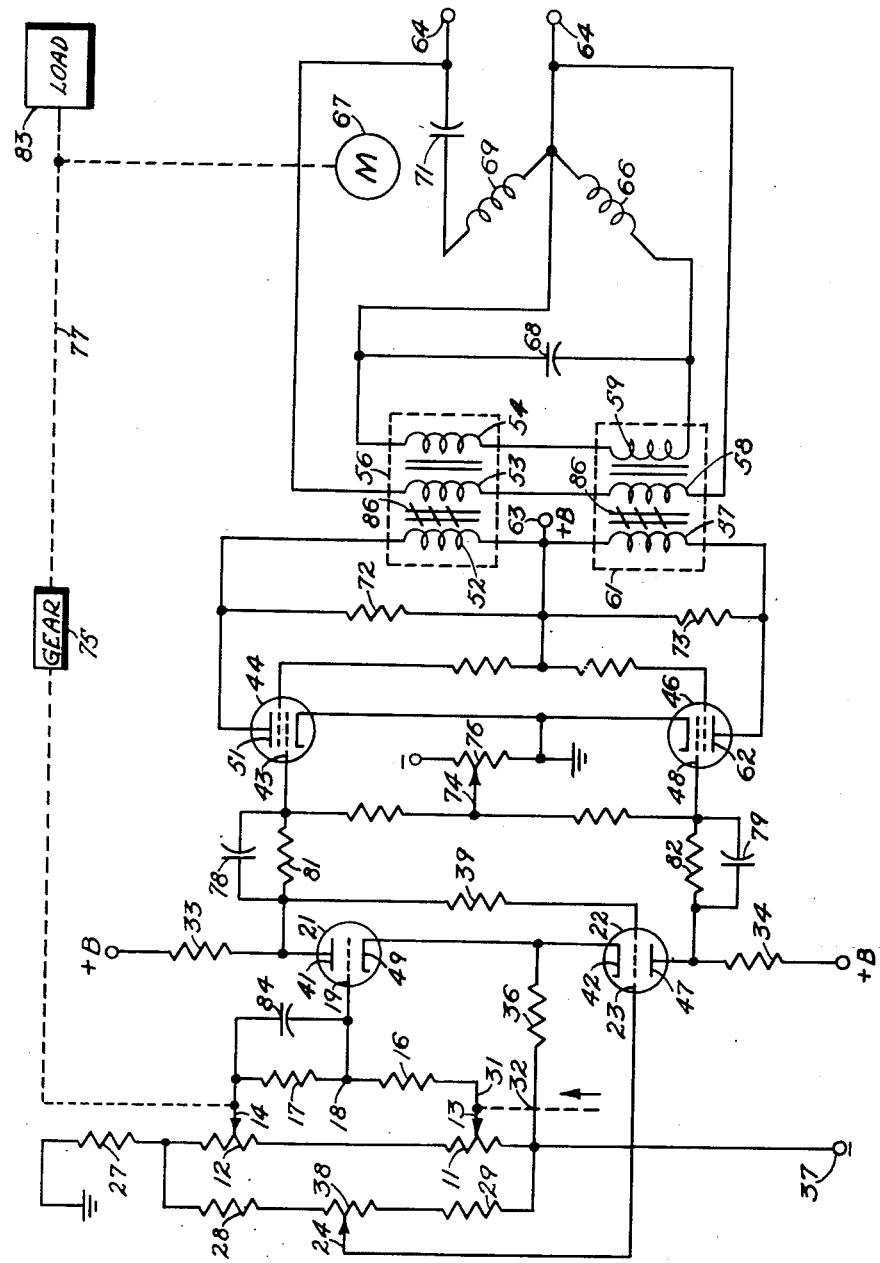
Figure 1 is a diagrammatic illustration of one form of the invention utilizing a saturable transformer.

Referring now to Fig. 1, two similar resistances 11 and 12 having sliders 13 and 14 are connected in series to form a differential potentiometer. The sliders 13 and 14 are connected together by two equal series resistors 16 and 17 the midpoint 18 of which is connected to the control grid 19 of a triode 21 which together with the triode 22 comprises a direct current differential amplifier stage. By proper selection of values for the circuit parameters of this stage and the particular circuit incorporated therein, this stage may be made to have infinite gain as will be explained more fully hereinafter.

The control grid 23 of the triode 22 derives its bias potential from a voltage divider circuit which consists of the resistor 29, the lower portion of the potentiometer 38 and the resistor 39, the series circuit formed by these elements being connected between a source of negative potential indicated diagrammatically by the terminal 37 and a positive potential point comprising the connection of the resistor 39 to the plate 41 of the tube 21.

The resistor 29 and potentiometer 38 together with resistor 28 are connected in shunt to the resistors 11 and 12 forming a bridge circuit therewith and this circuit is connected to ground through a resistor 27. A potential drop is therefore imposed across this bridge circuit and the slider 24 acts as a means for initially adjusting the differential balance of this bridge circuit.

The slider 13 is operated by any desired input mechanism, the exact nature of which depends on the application to which the invention is put, through the medium of a shaft 32.

The infinite gain amplifier composed of triodes 21 and 22 includes a common cathode resistor 36 connected to the negative potential source 37 and plate resistors 33 and 34 connected to a source of positive potential. The resistor 39 connected between the plate 41 of the tube 21 and the grid 23 of the tube 22, constituting a portion of the divider circuit for imposing the bias potential on the grid 23, coacts with the other circuit elements to produce infinite gain in the following manner:

Let it be assumed that the input displacement shaft 32 is pushed upward a finite amount, moving slider 13 upward. This change in the potentiometer adjustment makes conductor 31 more positive and also makes junction 18 more positive by a smaller amount. The grid 19 of tube 21 becomes more positive; more plate current flows and the potential drop in the cathode resistor 36 increases, raising the potential of the cathode 42 of the tube 22 and thus reducing its plate current flow. The increase of current flow in the plate resistor 33 reduces the potential of the plate 41 and of the grid 43 of tube 44 of the following stage, while the decrease of current flow in the plate resistor 34 increases the potential of its plate 47 by an equal amount and likewise of the grid 48 of tube 46. As so far described, the potential of the grid 23 has not changed. However, actually, because of the drop in potential of the plate 41 communicated through resistor 39, the potential of the grid 23 does drop somewhat, still further reducing the current flow through the cathode resistor 36 due to tube 22 and thus making the cathode 49 of the tube 21 more negative. This is equivalent to making the grid 19 more positive relative to the cathode, and by properly proportioning the resistor 39 to the voltages and other resistances, the amount by which the grid 19 is made in effect more positive by making the cathode more negative can be made exactly equal to the small initial grid change assumed as the input signal. Therefore a very small, even infinitesimal change of potential at the grid 19 will produce a large stage output. When there is any input signal at all, even though it be so small as to be unmeasurable, there will be an output signal limited in size only by the circuit constants. In this practical sense then as well as in the theoretical sense, the amplification is infinite and such an amplifier is here called an infinite gain amplifier. As here used in a servomechanism this circuit is stable, because the negative feedback servo loop will serve to damp out any oscillations which would otherwise persist.

The plate 51 of tube 44 of a second electronic amplifier stage is connected to the control coil 52 of a saturable transformer 56, and the plate 62 of tube 46 is similarly connected to the control coil 57 of a second saturable transformer 61. The other terminals of these control windings are connected to a terminal 63 representing a source of positive potentials. Each saturable transformer has a primary winding, 53 and 58, and a secondary winding 54 and 59 in inductive relation to its primary in addition to the direct current control winding 52 and 57. The latter winding is so placed as to be capable of magnetizing the transformer core yet not to be inductively coupled to the other windings on the core as is well understood in the art. The primary windings 53 and 58 are connected in series across a source of alternating potential represented by terminals 64—64, which may for example, be at 115 volts and 60 cycles. The secondary windings 54 and 59 are connected in series opposed to the two terminals of a coil 66 of a two-phase low-inertia motor 67. Being in opposed series, the instantaneous potentials of the secondary windings are opposed, which is equivalent to saying that they are 180° out of phase with each other. The secondary windings are also shunted by a condenser 68, the purpose of which is to provide a path for harmonic potentials and to reduce the amount of such harmonics flowing in coil 66. The other winding 69 of the two-phase motor is connected in series with a 90-degree phase-shifting condenser 71 across the power terminals 64. The direct current control windings are each shunted by a protective resistor 72 and 73, to provide discharge paths for the stored energy in the control coils on any sudden reduction of current through them, thus preventing flashover in the tubes 44 and 46 and consequent injury to them and other components. The static current flow through the control coils 52 and 57 is that of the respective tube plate currents, and is adjusted by slider 74 on potentiometer 76 controlling the negative bias on the grids 43 and 48.

The circuit being balanced when no signal is impressed thereon, equal plate currents flow in the control windings 52 and 57, partly and equally magnetizing their respective cores and somewhat reducing the magnetic permeability of each. Equal and moderate magnetizing currents will flow in the primary windings 53 and 58, and the inductive reactance drops across them will be equal. Accordingly equal potentials will be induced in the secondary windings 54 and 59, and since they are connected in opposition, no potential results across the motor winding 66. However, when an input signal occurs more current flows in one control coil, for example coil 57, and less in the other coil 52 as before stated. This increases the magnetization and decreases the permeability and induction in the core of the transformer 61 and produces an opposite change of like amount in transformer 56. Consequently the potential across the primary winding 58 drops, while that across the primary winding 53 rises an equal amount, and the secondary potentials are changed in a similar manner, that of the secondary 54 becoming larger than that of secondary 59. Current then flows because a net potential is produced across the motor coil 66, This potential will be approximately 180° displaced in phase from that across the primary winding 53 and at the terminals 64, therefore, the resulting current will lead that in the winding 69 by approximately 90° and the motor will rotate, let it be assumed, clockwise. Should the input signal be reversed, the current in the control coil 57 will exceed that in the coil 52 and the motor will rotate in the counterclockwise direction for similar reasons.

The dashed line 77 represents a mechanical negative feedback connection from the shaft of motor 67 through reduction gearing 75 to the slider 14 of potentiometer 12, the connection being in such sense that the rotation of the motor tends to restore the potential of the grid 19 of tube 21 to that which it had before reception of the signal. That is, if the signal consisting of a motion of the input shaft 32 were upward in the drawing and caused an increase of potential at the grid 19, the feedback signal would push the slider 14 downward, again decreasing the potential of the grid 19. Since the gain of the first stage is infinite, the fed back motion will continue until the potential of the grid 19 attains its exact initial potential, that is, zero change in error signal at the grid 19 occurs.

The rectangle 83 represents a mechanical load of any type, such as a dial, a generator, or another servo, which is to be operated by the servomechanism.

In most servomechanisms time lag must be minimized to eliminate oscillation and hunting and the greater part of the lag is usually in the mechanical parts of the loop. The condensers 78 and 79 connected in parallel to the resistors 81 and 82 between the outputs of tubes 21 and 22 and the inputs of tubes 44 and 46 neutralize part of this lag, producing phase advance in the two sides of the differential circuit under the conditions of changing or recurring signals.

The operation of the servomechanism as thus far described would be likely to produce overshooting or hunting of the feedback slider 14. To prevent such improper operation a condenser 84 is connected in shunt to the resistor 17. A varying potential at slider 14 will pass directly through this condenser 84 to the grid 19, so that the resistor 17 is effectively short-circuited. To the grid 19 it will then appear that the feedback slider has reached its final position when in fact it has traveled but half the necessary distance and, controlled by the time constant of the condenser 84 and the resistor 17, the grid will approach its ultimate potential at a continuously diminishing rate, so that overshooting or hunting will not occur.

Figure 2:
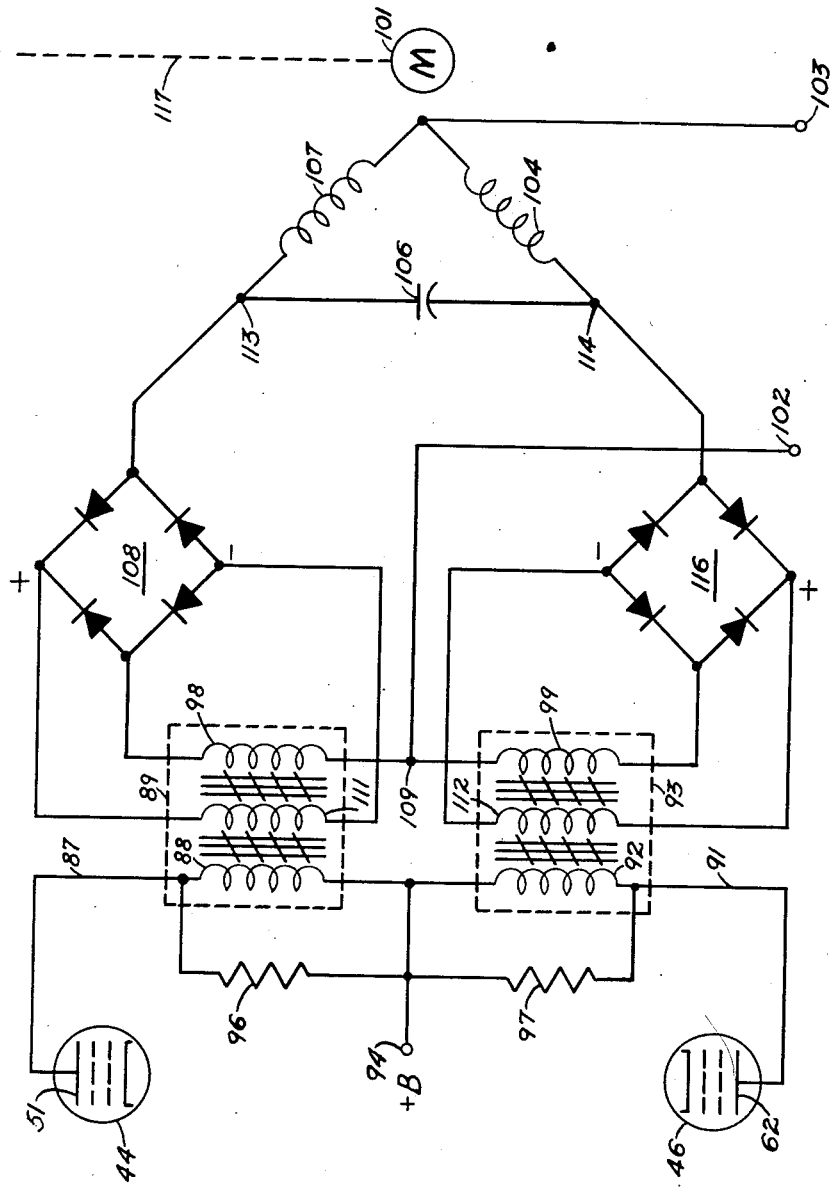
Figure 2 is a fragmentary diagram illustrating a modification of the invention utilizing a saturable reactor.

Figure 2 illustrates the employment of saturable reactors in place of the saturable transformers in the servomechanism of Fig. 1. Either type of saturable device can be used in such a servomechanism, the transformer affording more freedom in design, but the reactor is cheaper and utilizes a simpler circuit. Fig. 2 also illustrates the employment of a saturable electromagnetic device containing positive feedback.

In Fig. 2 only so much of the circuit as differs from that disclosed in Fig. 1 is illustrated, namely, that portion of the circuit connected to the outputs of tubes 44 and 46 which as in Fig 1 constitute the second stage of the amplifier circuit. The plate 51 of tube 44 is connected through the conductor 87 to the coil 88 of a reactor 89 and the plate 62 of tube 46 is connected through the conductor 91 to the coil 92 of a reactor 93. The other terminals of coils 88 and 92 are connected to a source of positive potential represented by terminal 94. Resistors 96 and 97 shunting coils 88 and 92 respectively, are provided to protect the tubes 44 and 46 against inductive surges if the currents through the coils should be suddenly reduced. The reactor 89 is provided with an alternating current winding 98 so positioned that the permeability of its core is controllable by the direct current coil 88, yet without magnetic coupling between them. Reactor 93 has a similar alternating current winding 99. Each alternating current winding is connected in series with one winding of a two-phase capacitor motor 101 across an alternating power source represented by terminals 102—103, which may be at 115 volts 60 cycles, the winding 98 being in series with motor field coil 107 and winding 99 being in series with motor field coil 104. One terminal of each field coil is connected to the power source terminal 103 while the other terminals 113 and 114 of the field coils are joined by a 90-degree phase-advancing condenser 106. The common terminal 109 of the reactor winding is connected to power terminal 102. A full wave rectifier 108 is connected in series between the reactor coil 98 and the motor field coil 107 and another similar rectifier 116 is connected between the reactor coil 99 and the motor coil 104. The direct output current from each rectifier supplies a feedback winding, 111 and 112, on its associated reactor core. These windings are arranged in noninductive relation with their respective alternating current windings, and are polarized to aid the magnetization effected by the direct current control windings 88 and 92. The number of turns on each feedback winding is not greater than the number of turns on its associated alternating current winding.

Under no-signal conditions as described in connection with Fig. 1, equal currents flow in the plate circuits of the discharge tubes 44 and 46 and in their control coils 88 and 92. These currents determine the permeabilities of their respective reactor cores and hence the amount of induction and back electromotive force effective in the two alternating current coils 98 and 99, results in equal potential drops across them. The currents through them will, therefore, be equal as will the currents through the series motor field coils 104 and 107, resulting in zero net motor field flux. But when an input signal exists as described in connection with Fig. 1 the discharge tube plate currents become unbalanced, for instance, the current in conductor 87 may become greater than that in conductor 91. The permeability of the core of reactor 89 will thereby be lowered, lowering the magnetic induction and the back electromotive force, resulting in a reduced potential drop across the coil 98 and a greater current through it. A corresponding reduction in the current through the coil 99 will simultaneously take place for similar reasons. The increased current through and potential across the motor field coil 107 compared with that of coil 104 will produce a net field flux, while the potential between the terminals 113 and 114 will produce a current through the condenser 106, energizing the motor field winding 104 phased 90° ahead of the energization of the field 107 and the motor will rotate. A reversal of the input signal resulting in a decrease of the current in conductor 87 and increase in conductor 91 will result in an opposite motor rotation.

Meanwhile, when the current through the reactor coil 98 increases, the current through the rectifier 108 will be increased, increasing the amount of direct current flowing in the feedback coil 89. Since the effect of this coil aids that of the control coil 88, the control effect is increased. Similarly, reduction in the alternating current through the rectifier 116 will reduce the feedback current in coil 112, enhancing the reduction in the control current in the coil 92.

The motor 101 is connected mechanically, as represented by dashed line 117, to a load and to a negative feedback slider as described in connection with Fig. 1, constituting a servo feedback loop, and operating as before described to deliver an output displacement theoretically equal and in practice equal within limits of manufacturing error to the input displacement.

What is claimed is:

1. In a servo system, means for producing a first potential proportional to an input quantity, means for producing a second potential, a device for varying said second potential, means for opposing said potentials to produce an "error signal" proportional to the unbalance thereof, a direct current differential amplifier having said "error signal" impressed on its input and having a first output circuit the potential of which varies directly as a function of said "error signal" and a second output circuit the potential of which varies inversely as a function of said "error signal" a first saturable electromagnetic device having a control winding connected in said first output circuit, a second saturable electromagnetic device having a control winding connected in said second output circuit, output windings for each of said saturable electromagnetic devices connected in series opposed relation, a two-phase motor, means including said series opposed output windings controlling the speed and direction of rotation of said motor and means for adjusting said first mentioned device in accordance with the rotation of said motor.

2. A servo system according to claim 1 in which said amplifier includes means for advancing the phase of the signal amplified thereby whereby time lag of response is greatly reduced.

3. A servo system according to claim 2 in which said amplifier is provided with means to produce infinite gain thereby over its operating range.

4. In a servo system means for producing a first potential proportional to an input quantity, means for producing a second potential, means for opposing said potentials to produce an "error signal" proportional to the unbalance thereof, a differential amplifier having said "error signal" impressed on its input and having a first output circuit the potential of which varies directly as a function of said "error signal" and a second output circuit the potential of which varies inversely as a function of said "error signal," a first saturable transformer having a control winding connected in said first output circuit, a second saturable transformer having a control winding connected in said second output circuit, primary windings for each of said saturable transformers energized by an alternating current, secondary windings for each of said saturable transformers connected in series opposed relation, a two-phase motor having a first field coil energized by a source of phase-shifted alternating current and a second field coil connected in circuit with said secondary windings and means for adjusting said first mentioned device in accordance with the operation of said motor.

5. A servo system according to claim 4 in which said amplifier includes means for advancing the phase of signal amplified thereby, whereby time lag of response is greatly reduced.

6. A servo system according to claim 5 in which said amplifier is provided with means to produced infinite again thereby over its operating range.

7. In a servo system means for producing a first potential proportional to an input quantity, means for producing a second potential, a device for varying said second potential, means for opposing said potentials to produce an "error signal" proportional to the unbalance thereof, a differential amplifier having said "error signal" impressed on its input and having a first output circuit the potential of which varies directly as a function of said "error signal" and a second output circuit the potential of which varies inversely as a function of said "error signal" a first saturable reactor having a control winding connected in said first output circuit, a second saturable reactor having a control winding connected in said second output circuit, alternating current windings for each of said saturable reactors connected in series opposed relation, a motor having a pair of field coils displaced 90 electrical degrees with respect to each other with their adjacent ends connected together and to one terminal of an alternating current supply source and their remote ends connected to the remote ends of the saturable reactor alternating current windings, a circuit connecting the adjacent ends of said alternating current windings and the remaining terminal of said alternating current supply source, a condenser connected in parallel to said motor field coils and means for adjusting said first mentioned device in accordance with the operation of said motor.

8. A servo system according to claim 7 in which said amplifier includes means for advancing the phase of the signal amplified thereby, whereby time lag of response is greatly reduced.

9. A servo system according to claim 8, in which said amplifier is provided with means to produce infinite gain thereby over its operating range.

10. A servo system according to claim 9 in which each of said saturable reactors is provided with a third winding each of which is energized by a direct current proportional to the alternating current flowing through its associated alternating current winding.

11. In a servo system, means for producing a first potential proportional to an input quantity, means for producing a second potential, a device for varying said second potential, means for opposing said potentials to produce an "error signal" proportional to the unbalance thereo, a differential amplifier comprising first and second tubes having their cathodes connected together and to a source of potential through a common cathode resistor, means for impressing said "error signal" on the control electrode of said first tube, a voltage divider network connected between the plate of said first tube and a terminal of lower potential, a connection between the control electrode of said second tube and an intermediate point on said voltage divider network, said common cathode resistor and said voltage divider network being so proportioned that a variation in "error signal" results in an equal and opposite change in the potential of the cathode of said first tube, a saturable electromagnetic device having a control winding actuated by said amplifier output and motor means controlled by said saturable electromagnetic device for adjusting said first mentioned device to reduce said "error signal" to zero.

12. In a servo system, means for producing a first potential proportional to an input quantity, means for producing a second potential, a device for varying said second potential, means for opposing said potentials to produce an "error signal" proportional to the unbalance thereof, a differential amplifier comprising first and second tubes having their cathodes connected together and to a source of potential through a common cathode resistor, means for impressing said "error signal" on the control electrode of said first tube, a voltage divider network connected between the plate of said first tube and a terminal of lower potential, a connection between the control electrode of said second tube and an intermediate point on said voltage divider network, said common cathode resistor and said voltage divider network being so proportioned that a variation in "error signal" results in an equal and opposite change in potential of the cathode of said first tube, a first output circuit connected to said differential amplifier whose potential varies directly as a function of said "error signal" a second output circuit connected to said differential amplifier whose potential varies inversely as a function of said "error signal," a first saturable transformer having a control winding connected in said first output circuit, a second saturable transformer having a control winding connected in said second output circuit, primary windings for each of said saturable transformers energized by an alternating current, secondary windings for each of said saturable transformers connected in series opposed relation, a two-phase motor having a first field coil energized by a source of phase-shifted alternating current and a second field coil connected in circuit with said secondary windings and means for adjusting said first mentioned device in accordance with the operation of said motor to restore the balance between said first and second potentials and to reduce said "error signal" to zero.

13. A servo system according to claim 12 in which said differential amplifier includes a phase advancing circuit whereby changes in "error signal" are anticipated and the time lag of response is greatly reduced.

14. In a servo system means for producing a first potential proportional to an input quantity, means for producing a second potential, a device for varying said second potential, means for opposing said potentials to produce an "error signal" proportional to the unbalance thereof, a differential amplifier comprising first and second tubes having their cathodes connected together and to a source of potential through a common cathode resistor, means for impressing said "error signal" on the control electrode of said first tube, a voltage divider network connected between the plate of said first tube and a terminal of lower potential, a connection between the control electrode of said second tube and an intermediate point on said voltage divider network, said common cathode resistor and said voltage divider network being so proportioned that a variation in "error signal" results in an equal and opposite change in potential of the cathode of said first tube, a first output circuit connected to said differential amplifier whose potential varies directly as a function of said "error signal," a second output circuit connected to said differential amplifier whose potential varies inversely as a function of said "error signal," a first saturable reactor having a control winding energized by said output circuit, a second saturable reactor having a control winding energized by said second output circuit, alternating current windings for each of said saturable reactors connected in series opposed relation, a motor having a pair of field coils displaced 90 electrical degrees with respect to each other with their adjacent ends connected together and to one terminal of an alternating current supply source and their remote ends connected to the remote ends of the saturable reactor alternating current windings, a connection between the adjacent ends of said alternating current windings and the remaining terminal of said alternating current supply source, a condenser connected in parallel to said motor field coils and means for adjusting said first mentioned device in accordance with the operation of said motor to restore the balance between said first and second potentials and to reduce said "error signal" to zero.

15. A servo system according to claim 14 in which said differential amplifier includes a phase advancing circuit whereby changes in "error signal" are anticipated and the time lag of response greatly reduced.

JAMES P. PALMER.

REFERENCES CITED

The following references are of record in the file of this patent:

UNITED STATES PATENTS

| Number | Name | Date |
| --- | --- | --- |
| 2,208,623 | Bond | July 23, 1940 |
| 2,333,393 | Ryder | Nov. 2, 1943 |
| 2,338,423 | Geyger | Jan. 4, 1944 |
| 2,355,567 | Sparrow | Aug. 8, 1944 |
| 2,414,936 | Edwards et al. | Jan. 28, 1947 |
| 2,435,926 | Krupick | Feb. 10, 1948 |
| 2,449,859 | Penfold et al. | Sept. 21, 1948 |
| 2,450,084 | Emerson | Sept. 28, 1948 |

OTHER REFERENCES

D. C. Operated Servo Amplifier, by Sidney Wald, August 1948, Radio News, pp. 14, 15 and 28.